United States Patent
Bonavitacola

Patent Number: 5,411,101
Date of Patent: May 2, 1995

[54] COMBINATION CULTIVATOR AND EDGING TOOL

[76] Inventor: Michael Bonavitacola, 50 Woodvalley La., Port Washington, N.Y. 11050

[21] Appl. No.: 96,565

[22] Filed: Jul. 22, 1993

[51] Int. Cl.⁶ .......... A01B 1/08; A01B 1/14; A01B 1/20; A01D 9/02
[52] U.S. Cl. .............. 172/378; 172/375; 294/51
[58] Field of Search .................. 294/51; 172/375, 378

[56] References Cited

U.S. PATENT DOCUMENTS

| | | | |
|---|---|---|---|
| D. 139,367 | 11/1944 | Keller | 172/375 X |
| D. 230,247 | 2/1974 | Parry | 172/375 X |
| D. 265,168 | 6/1982 | Zabarte | 172/375 X |
| 311,428 | 1/1885 | Hill | 172/375 |
| 1,528,843 | 3/1925 | Olesen | 172/375 |
| 2,010,325 | 8/1935 | Sawyer | 172/375 X |
| 2,243,127 | 5/1941 | Roseman | 172/375 X |
| 2,429,120 | 10/1947 | Brandt | 172/375 |
| 2,947,370 | 8/1960 | Nelson | 172/375 |
| 3,181,620 | 5/1965 | Lowery | 172/375 |
| 3,226,149 | 12/1965 | McJohnson | 172/375 X |
| 3,638,986 | 2/1972 | Palagonia | 172/375 X |
| 3,921,725 | 11/1975 | Trutor et al. | 172/375 |
| 4,049,059 | 9/1977 | Weibling | 172/15 |
| 4,072,195 | 2/1978 | Carlson | 172/15 |
| 4,813,490 | 3/1989 | Proudfoot | 172/378 |
| 5,003,760 | 4/1991 | Webb | 172/379 X |

*Primary Examiner*—Randolph A. Reese
*Assistant Examiner*—Christopher J. Novosad
*Attorney, Agent, or Firm*—Collard & Roe

[57] ABSTRACT

A combination cultivator and edging tool including a handle and a head attached to one end of the handle. The head includes a transverse support member and a row of long cultivator tines, each tapering from a point of connection to the support member toward a tip. The tines extend in a common plane of extension disposed generally perpendicular to the handle and the transverse support member. The head further includes a blade having a support edge and a sharpened edge opposite the support edge. The blade is disposed in the same plane as the handle and the transverse support member. In use, the handle is disposed at an angle to the ground for cultivating. The handle is alternatively disposed vertically with respect to the ground for edging.

2 Claims, 2 Drawing Sheets

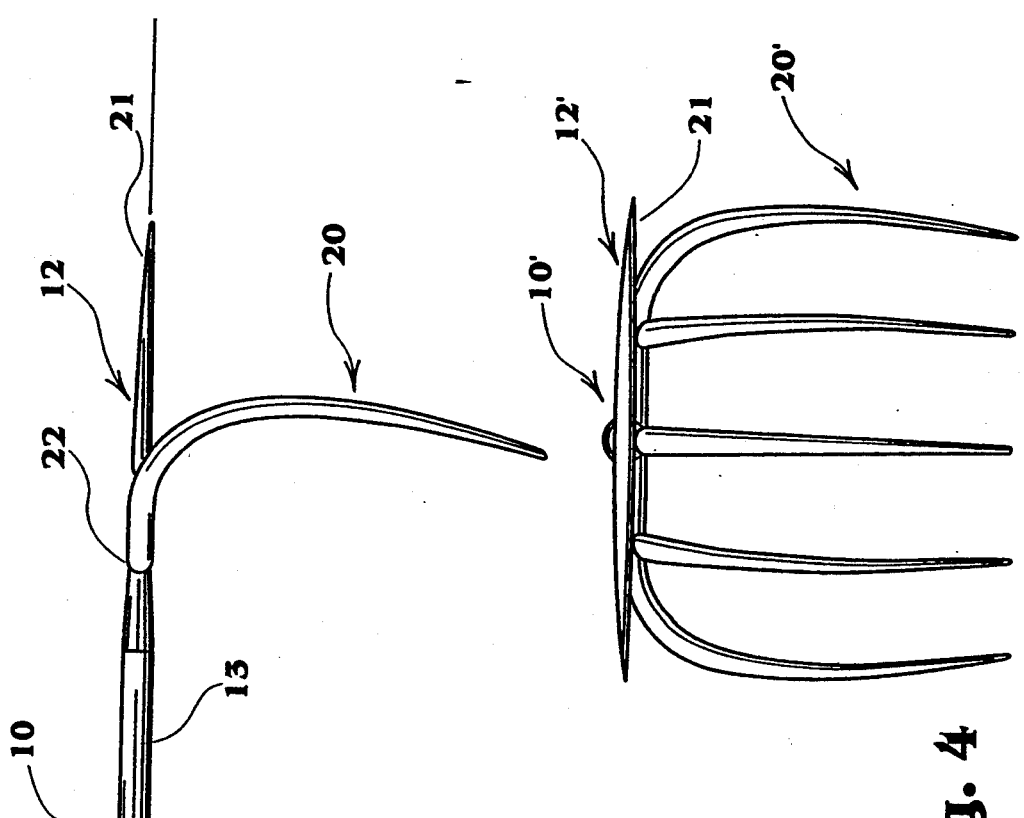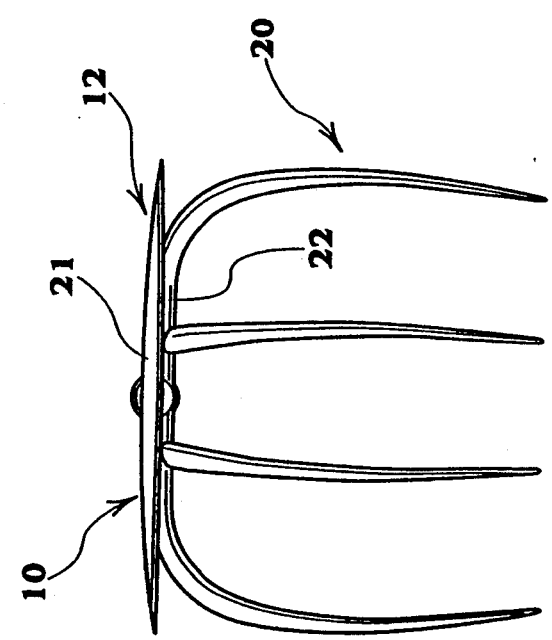

5,411,101

COMBINATION CULTIVATOR AND EDGING TOOL

BACKGROUND OF THE INVENTION

1. Field of the Invention

The present invention relates to a combination cultivator and edging tool for manually cultivating and edging soil.

2. The Prior Art

Cultivators and edgers are common garden tools used for cultivating and edging the soil, particularly around flower beds. Commercial landscapers, for instance, cultivate the soil in a garden bed with a cultivator and use an edger or shovel to edge the periphery of the garden. It is thus disadvantageous for the user to perform the desired task using two individual tools, wherein each of the tools has to be handled separately in order to do the job.

The prior art patents disclose numerous combination garden tools. For example, U.S. Pat. No. 4,049,059 to Weibling and U.S. Pat. No. 4,072,195 to Carlson, disclose an electrically powered combined garden cultivator and lawn edger. The Weibling patent has certain disadvantages in that it must be plugged in, in order to be operative. In addition, the cultivator assembly must be removed and replaced by a rotary edging blade in order to switch between cultivating and edging.

Other patents, for example, U.S. Pat. No. 3,638,986 to Palagonia, U.S. Pat. No. 4,813,490 to Proudfoot and U.S. Pat. No. 5,003,760 to Webb disclose various other combination garden tools. However, none of these references disclose a combination cultivator and edging tool.

SUMMARY OF THE INVENTION

It is therefor an object of the present invention to provide a combination cultivator and edger in one tool.

It is yet another object of the present invention to provide a combined cultivator and edging tool which is simple in design, easy to manufacture and reliable in operation.

It is yet another object of the present invention to provide a combined cultivator and edging tool that has several surfaces that can be used to force the edger into the soil.

These and other related objects are achieved according to the invention by a device for cultivating and edging soil including a handle with two spaced opposite ends. A head is attached to the one end of the handle and includes cultivator means and edging means. The cultivator means is comprised of a transverse support member and a row of relatively long cultivator tines, each tapering from a point of connection to the support member toward a tip. Each tine extends in a plane of extension substantially parallel to the other tines. The plane of extension is generally perpendicular to the handle axis and the transverse support member. The edging means includes a blade member having a support edge and a sharpened edge opposite the support edge. The blade member is disposed in the same plane as the handle and the transverse support member. The handle is disclosed at an angle to the ground with the tines facing the ground for cultivating. The handle is disposed vertically with respect to the ground with the sharp end edge facing the ground for edging. Foot pressure on at least one of the support member and the support edge facilitates entry of the sharp end edge into the ground.

BRIEF DESCRIPTION OF THE DRAWINGS

Other objects and features of the present invention will become apparent from the following detailed description considered in connection with the accompanying drawing which discloses two embodiments of the present invention. It should be understood, however, that the drawing is designed for the purpose of illustration only and not as a definition of the limits of the invention.

In the drawing, wherein similar reference characters denote similar elements throughout the several views:

FIG. 2 is a left side elevational view thereof;

FIG. 3 is a front side elevational view thereof showing four (4) tines; and

FIG. 4 is a front side elevational view of an alternate embodiment of the invention showing five (5) tines.

DETAILED DESCRIPTION OF PREFERRED EMBODIMENTS

Figure 1:
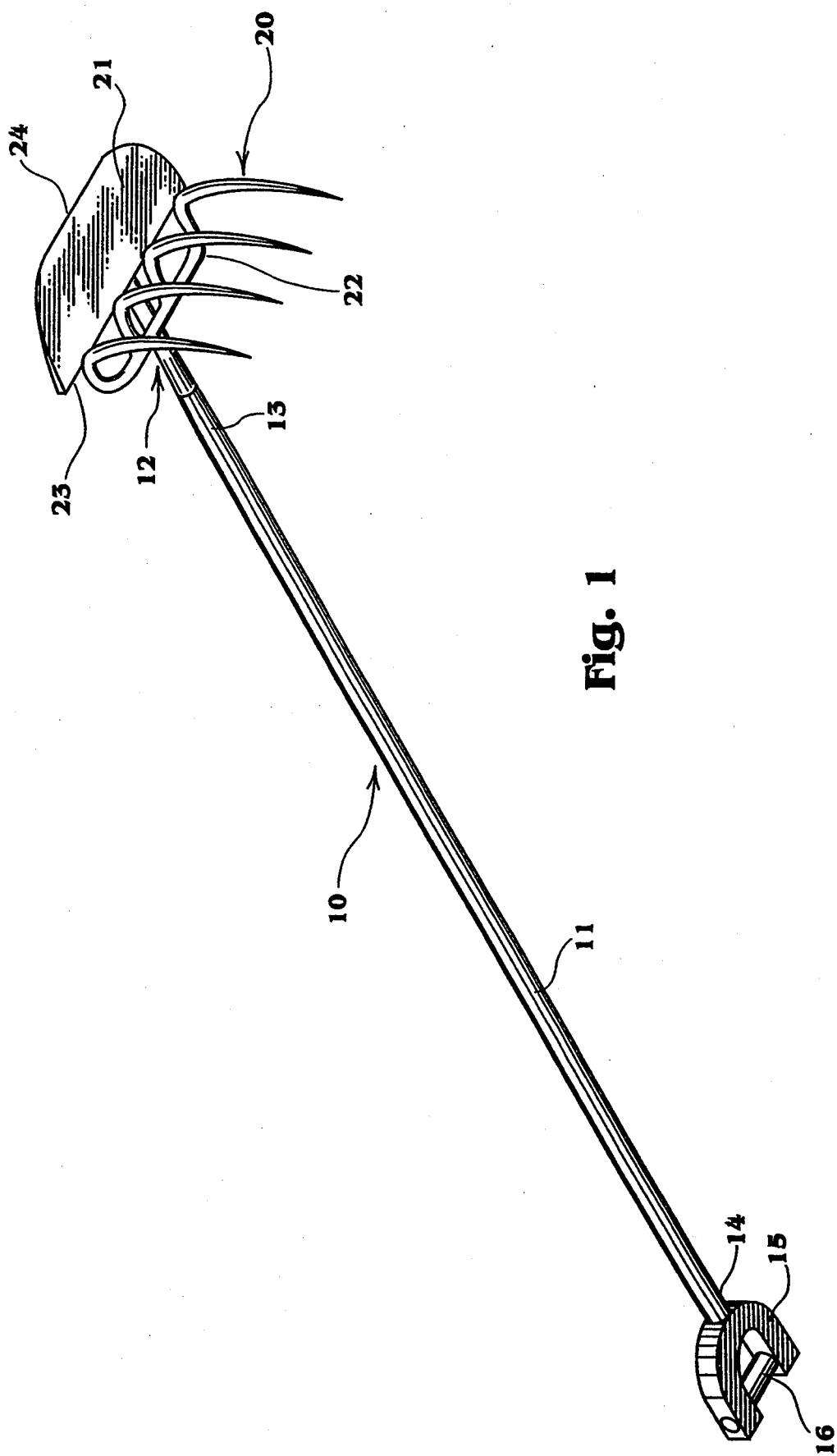
FIG. 1 is a perspective view of an embodiment of the combined cultivator and edging tool according to the invention.

Referring now in detail to the drawings, and in particular FIGS. 1-4, there is shown a combined cultivator and edging tool 10, having an elongated handle 11 having a central axis and a head 12 attached to one end 13 of handle 11. As can be seen in FIG. 1, the other end 14 of handle 11 is provided with a U-shaped hand grip 15 which is closed by a hand bar 16. Alternatively, as can be seen in FIG. 2, end 14 of handle 11 may be a plain rounded handle.

Head 12 includes a plurality of L-shaped tines 20 and an edger 21. Edger 21 includes a blunt edge or support edge 23 and a sharpened edge 24. A transverse support member 22 attached to one end of the handle 11 perpendicular to the central axis is provided for connecting tines 20 to head 12. Each tine 20 tapers from a point of connection to the transverse support member toward a pointed tip and each tine has a short leg and a long leg, each short leg extending from the transverse support member parallel to the central axis, each long leg extending from the short leg perpendicular to the central axis and the transverse support member, wherein each short leg is integrally joined with the transverse support member and wherein each long leg is integrally joined with each short leg. As can be most clearly seen in FIG. 2, handle 11 having a central axis transverse support member 22, the short legs and edger 21 are disposed within a first plane. The long legs of the tines 20 which face the ground for cultivating are disposed in another plane which is substantially perpendicular to the first plane. Since transverse support member 22 is disposed within the same plane as edger 21, transverse support member 22 or a blunt edge 23 of edger 21 may be utilized to force sharpened edge 24 into the soil. The handle 11 extends down between two of the short legs to contact the blunt edge 23 of edger 21 as best shown in FIGS. 1, 3 and 4.

FIG. 3 shows a set of four tines separated by lateral spaces forming the cultivator. FIG. 4 discloses five tines 20' forming the cultivator means.

As can be appreciated by those skilled in the art, a variety of other handles may be employed with the combined cultivator and edger 10. In addition, any suitable number of tines may be provided as part of the cultivator. Finally, edger 21 may assume a variety of different shapes, for example, flat, rounded, scalloped etc. The combined cultivator and edger 10 may be a relatively small hand held version with the handle having the length of about one foot, or may be full size with handle 11 having a length of approximately five to six feet. Handle 11 may be constructed of plastic or wood with a U-shaped hand grip being constructed from plastic, wood, metal and alike. Hand grip 17 can be made from plastic, rubber, or suitable similar materials. Head 12 may be constructed of any rigid material, such as steel, aluminum or from engineering grades of plastic.

While several embodiments of the present invention have been shown and described, it is to be understood that many changes and modifications may be made thereunto without departing from the spirit and scope of the invention as defined in the appended claims.

What is claimed is:

1. A combination cultivator and edging tool comprising:
    a longitudinally extending handle having a central axis and two spaced opposite ends; and
    a transverse support member attached to one end of said handle perpendicular to said central axis;
    a row of relatively long L-shaped cultivator tines, each tine tapering from a point of connection to said transverse support member toward a pointed tip and each tine having a short leg and a long leg, each short leg extending from said transverse support member parallel to said central axis, each long leg extending from said short leg perpendicular to said central axis and said transverse support member; and
    a blade member having a support edge and a sharpened edge opposite said support edge, said blade member being disposed in substantially the same plane as said handle central axis, said short legs and said transverse support member; said handle extending down between two of said short legs to contact said support edge of said blade member;
    wherein said handle is disposed at an angle to the ground with said long legs of said tines facing the ground for cultivating; and
    wherein said handle is disposed substantially vertically with respect to the ground with said sharpened edge facing the ground for edging;
    wherein foot pressure on said transverse support member facilitates entry of said sharpened edge into the ground.

2. A manually operated combination cultivator and edging tool comprising:
    an elongated handle having a central axis and two spaced opposite ends; and
    a transverse support member attached to one end of said handle perpendicular to said central axis;
    a plurality of downwardly projecting L-shaped tines separated by lateral spaces, each tine having a first leg integrally joined with said transverse support member and a second leg integrally joined with said first leg, said plurality of second legs being located within a first plane disposed generally perpendicular to said handle axis and said transverse support member; and
    a blade member having a blunt edge and a sharpened edge opposite said blunt edge, said blunt edge being connected to said plurality of first legs so that said blade member, said handle central axis, said first legs, and said transverse support member are located substantially within a common second plane; said handle extending down between two of said first legs to contact said blunt edge of said blade member;
    wherein said first plane is disposed obliquely to the ground with said plurality of tines facing the ground for cultivating; and
    wherein said second plane is disposed perpendicular to the ground with said sharpened edge of said blade member facing the ground for edging, wherein pressure on said transverse support member facilitates entry of said sharpened edge into the ground.

* * * * *